(No Model.)
E. ROAT.
ART OF MANUFACTURING STARCH AND APPARATUS THEREFOR.
No. 254,239. Patented Feb. 28, 1882.
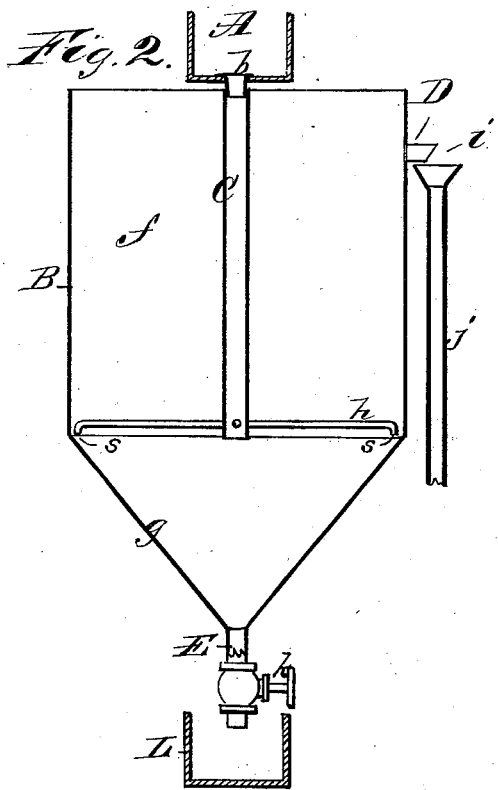
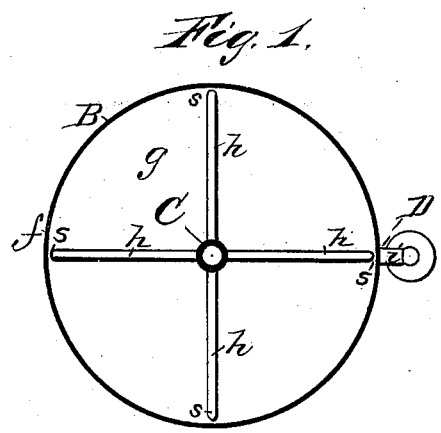
WITNESSES:
Geo. H. Sonneborn
W. H. Sonneborn
INVENTOR
Edwin Roat
BY John R. Bennett
ATTORNEY

UNITED STATES PATENT OFFICE.

EDWIN ROAT, OF BUFFALO, NEW YORK, ASSIGNOR TO HARRY HAMLIN, OF SAME PLACE.

ART OF MANUFACTURING STARCH AND APPARATUS THEREFOR.

SPECIFICATION forming part of Letters Patent No. 254,239, dated February 28, 1882.

Application filed January 28, 1882. (No model.)

*To all whom it may concern:*

Be it known that I, EDWIN ROAT, of Buffalo, in the county of Erie and State of New York, have made an invention of certain new and useful Improvements in the Art of Manufacturing Starch, and in Apparatus therefor; and I do hereby declare that the following, taken in connection with the accompanying drawings, is a full, clear, and exact description and specification of the same.

The object of this invention is to concentrate starch-milk or starch-water, so as to deprive the starch of a large quantity of the water with which it is mechanically mixed in the process of manufacture. Heretofore this operation has been conducted in subsiding-tanks, in which the starch-water, after the tank has been filled with it, is permitted to remain at rest until the starch has in whole or mainly subsided, after which the water above the deposited starch is drawn off. The concentration of starch-water in this manner is an intermittent operation, and requires the use in a large factory of a great number of subsiding-tanks, which occupy great space.

The practical effect of my invention is to enable the operation of concentrating or settling the starch to be conducted in much less space and to be a practically continuous operation. To this end my invention consists of a certain process and means, which are recited in the claims at the close of this specification. In order that the same may be fully understood, I have represented in the accompanying drawings and will proceed to describe the best mode in which I have constructed my apparatus at this date, it being understood that the apparatus may be modified without ceasing to embody my improvements, as circumstances or the views of different constructers or users render expedient.

In said drawings, Figure 1 represents a plan of said apparatus, and Fig. 2 represents a central vertical section of the same with some of the parts in elevation.

In said drawings the apparatus is represented as adapted to operate upon the starch-water or starch-milk obtained from the sieve-separators of a starch-factory. The starch-milk is conducted to the apparatus by means of the trough A, whose bottom is fitted with a nozzle, *b*, through which the starch-water is permitted to issue to the subsiding apparatus. This apparatus comprises the tank B, the inlet-pipe C, the overflow D, and the outlet E.

The tank is by preference constructed with a cylindrical body, *f*, closed beneath by a conical bottom, *g*. The inlet-pipe C is in this case arranged centrally of the tank, and has four branches, *h h h h*, whose mouths discharge near the bottom *g*. The overflow D is an opening near the top of the tank, and is by preference fitted with a nozzle, *i*, to deliver the exhausted (or partly exhausted) liquid into a discharge-pipe, *j*. The outlet is arranged at the lower end of the conical bottom of the tank, and is fitted with a valve, *k*. Beneath the tank is the trough L, into which the concentrated starch is discharged.

The process of concentration with the above-described apparatus may be conducted as follows: The starch-milk is permitted to enter the apparatus by the inlet-pipe C, to fill the tank, and to escape at the outlet, the rate of inlet being controlled either by the size of the discharge-apertures of the inlet-pipe or by partly obstructing the nozzle of the trough A by a plug or valve, so that the passage of the starch-water in an upward direction from the inlet-orifices *s s s s* to the overflow D is slow enough to permit the starch to sink in whole or in part to the bottom of the tank, and consequently the liquid which escapes at the overflow is deprived in whole or in part of starch, while the mass in the lower part of the tank consists of starch mixed with a much less quantity of liquid than that which is admitted by the inlet-pipe. Consequently the starch-milk at the bottom of the tank is in a highly concentrated condition, and it may be drawn off at intervals or continuously, as deemed best, it being understood that the drawing off must be at so slow a speed as not to materially affect the deposit of the starch from the running liquid above, and that the aggregate matter drawn off must always be materially less in bulk than the aggregate of matter admitted to the tank by means of the inlet-pipe.

From the above description it will be understood that, inasmuch as the concentration of 1 the starch takes place while the starch-milk is entering the inlet-pipe and escaping at the overflow, the deposition of the starch is effected from the running liquid, instead of from a liquid in the condition of rest, as has previously been the case in tanks for subsidence. Moreover, the quantity of concentrated starch collected in a tank at any one time does not depend upon the single filling of the tank with the starch-milk, as has been the case previously, but depends upon the quantity of starch-milk which may be run through the tank.

The operation of concentrating the starch above described may be varied. Thus the outlet E may be kept closed until the concentrated starch has accumulated in the tank to such an extent that the overflowing liquid carries off nearly or quite as much starch as it contains when entering the inlet-pipe. Then the inlet of starch-water may be stopped, the mass in the tank may be allowed to rest until the water becomes clear, or nearly so, after which the clear water may be siphoned off and the concentrated starch removed from the tank; and if the starch be too thick to run freely it may be stirred up with some of the water. In this case, however, the greater part of the starch is deposited, as previously described, from the liquid while running through the tank, while the removal of the starch is intermittent. The precise arrangement of the inlet-pipe and overflow also is not essential, as the inlet-pipe may be at the outside of the tank and connected with it only at the discharge orifice or orifices. The overflow also may be the mouth of a pipe which extends into the upper end of the tank. The form of the tank also may be varied, and the outlet for the concentrated starch, instead of being central, may be at one side of the tank, at or near its bottom, and may be replaced by a siphon or draft pipe. I have, however, reason to believe that the apparatus will operate with the best effect when the parts of the apparatus have the arrangement and form represented in the drawings.

It will be perceived that the subsidence of the starch from the liquid while in motion takes place by reason of the large area of the tank as compared with the area of the inlet-orifices, whereby the current of liquid rising from the inlet-orifices to the overflow is caused to flow so slowly that time is afforded for the subsidence of the starch by gravitation. Hence, other things being equal, the rate of concentration depends upon the relative areas of the inlet-orifices and the tank.

For operating on a large scale a tank twelve feet in diameter and twelve feet deep may be used, and the discharge-orifices of the inlet-pipe may be four or six in number, and may have an aggregate transverse area of three inches. Good results, may however, be attained with a much smaller apparatus. Thus I have used with success a tank only seven feet in diameter and eight feet deep, the aggregate area of the inlet-orifices being two inches. Hence the invention is not restricted to the precise areas and proportions of the parts.

If the water escaping from the overflow is practically free of starch, it may be permitted to run to waste; but if the inlet be permitted at such a rate that a material percentage of the starch is carried off with the escaping liquid this liquid may be conducted through one or more apparatuses of the same kind, so as to exhaust the starch-water of starch; and, if necessary, the tanks of such succeeding apparatuses may be of larger area than the first, or the liquid escaping at the overflow of the first tank may be divided to two or more successive tanks of the size of the first, so that the flow through them will be slower than that through the first tank. In such case the succeeding tank should be set at a progressively lower level than the first tank, or the liquid should be pumped from one tank to the next in succession.

The apparatus and process thus described may be employed with advantage in separating other pulverulent matters than starch from the water with which it is mechanically mixed.

I claim as my invention—

1. The subsiding apparatus composed substantially, as before set forth, of the tank, the inlet-pipe, the outlet, and the overflow.

2. The process, substantially as before set forth, of concentrating starch from the running starch-milk by causing the same to flow at a slow speed through a tank in an upward direction.

3. The process, substantially as before set forth, of concentrating starch continuously from the running starch-milk by causing the same to flow slowly through a tank, permitting the larger portion of the liquid to overflow at the upper part of the tank, and withdrawing the concentrated residue from the bottom of the tank.

Witness my hand this 25th day of January, A. D. 1882.

EDWIN ROAT.

Witnesses:
 WM. HAMLIN,
 C. D. ELLIS.